United States Patent Office 3,457,953
Patented July 29, 1969

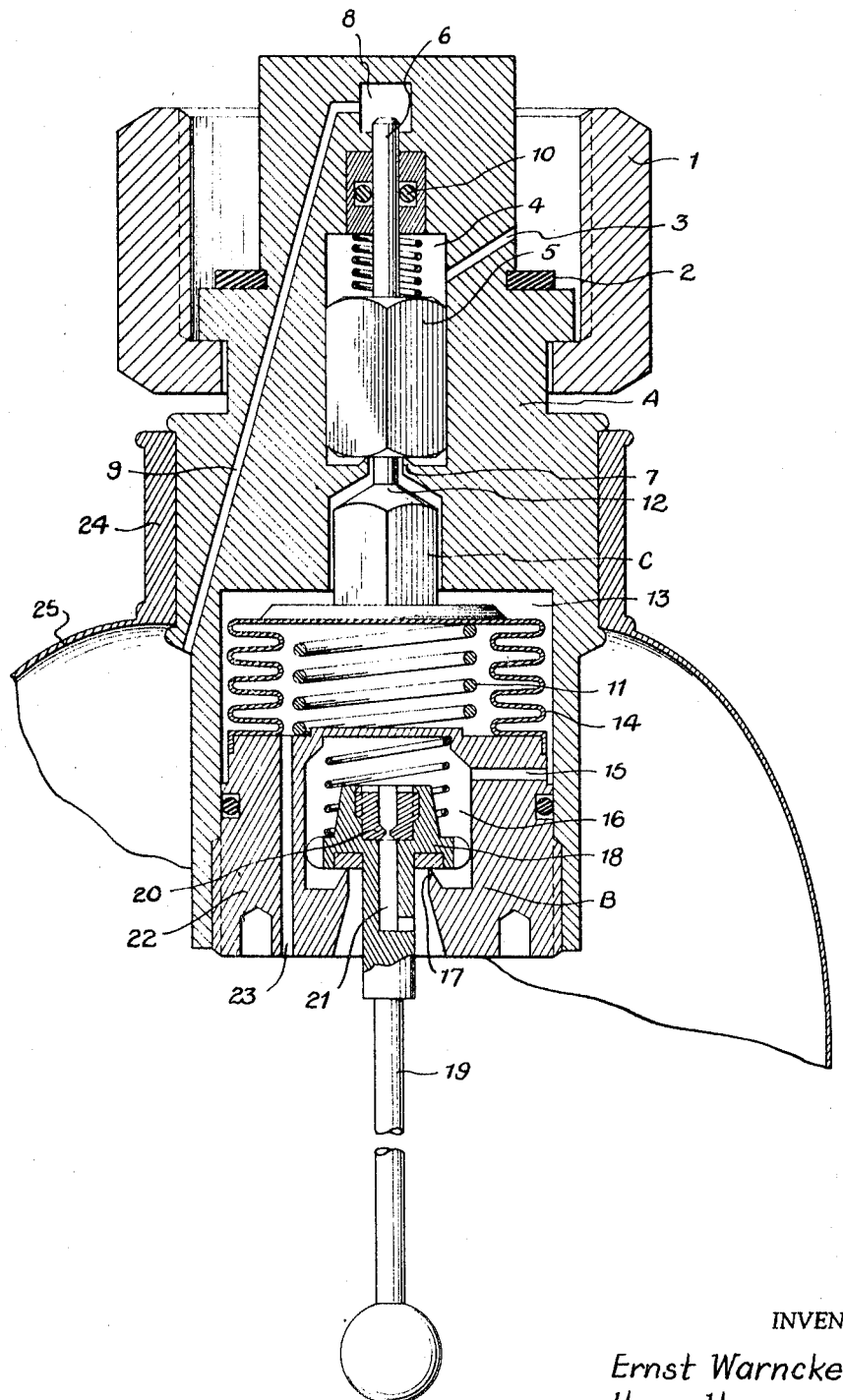

3,457,953
LUNG-CONTROLLED VALVE FOR BREATHING
APPARATUS
Ernst Warncke and Hans Haas, Lubeck, Germany, assignors to Otto H. Drager, Lubeck, Germany
Filed Apr. 29, 1966, Ser. No. 546,250
Claims priority, application Germany, June 16, 1965,
D 47,521
Int. Cl. F16k 1/16; A61m 16/00
U.S. Cl. 137—614.19   5 Claims

ABSTRACT OF THE DISCLOSURE

In a breathing apparatus, a valve housing for a compressed gas tank valve contains in axial alignment pressure reducing valve and a breathing bag operated gas outlet valve. The pressure reducing valve is between the gas tank and the outlet valve. Gas flows axially through the valve housing.

---

This invention relates to a valve for a breathing apparatus and, in particular, to a valve which is opened and closed by air pressure furnished from the lungs of a patient.

Such a valve connecting a compressed air tank with a breathing bag is disclosed in the copending application of Warncke et al., Ser. No. 536,467, filed Mar. 22, 1966, for "Breathing Apparatus."

Valves of this type control the flow of gas from a source of compressed gas in dependence upon the pressure ratio existing in the breathing apparatus. A pressure reducer is used to reduce the pressure of the compressed gas and the lung controlled valve is connected to the pressure reducer. This arrangement has the disadvantage in that two valves must be mounted adjacent one another on the breathing apparatus. This makes a cumbersome construction. Another great disadvantage exists because of the number of structural parts needed for the valves. In the breathing apparatus, a so-called constant metering device is also used which is mounted in a line leading from the low pressure side of the pressure reducer through a metering nozzle into the breathing apparatus for giving a constant supply of approximately uniform amounts of gas.

An effort has been made to avoid these disadvantages by connecting the lung-controlled valve to immediately follow the high pressure valve. Also, it has been proposed to connect the lung-controlled valve body directly to the compressed air tank. Such has the disadvantage in that the movable parts of the lung-controlled valve are directly contacted by the high pressure gas. Another disadvantage is that it is not possible to install the so-called constant metering device. A constant uniform supply of compressed gas presupposes at least an approximately constant low gas pressure coming from the pressure reducing valve from the beginning. The metering nozzle for the constant metering device is supposed to be at approximately the same prepressure and independent of the pressure in the compressed gas tank.

The object of this invention is to avoid the disadvantages of the heretofore used apparatus by producing an apparatus in which the lung-controlled valve is not directly in contact with the high pressure gas and in which the pressure reducing valve is reduced in size and of simple construction.

In this invention, the pressure reducing valve and the lung-controlled valve are aligned with one another in a common housing. This has the advantage that the pressure reducing valve and the lung-controlled valve use less space than heretofore and the two valves have fewer structural parts.

The means by which the objects of the invention are obtained are disclosed more fully with reference to the accompanying drawing showing a cross-sectional view through the valve.

Housing A contains the lung-controlled valve B and the piston C forming the pressure reducing valve. Housing A is adapted to be connected to the outlet high pressure valve of a compressed air tank by means of the cap nut 1. The connection is made gas-tight by means of the seal 2. When the high pressure valve on the gas tank is opened, life-sustaining gas flows through bore 3 into the high gas pressure chamber 4. The polygonal shaped valve head 5 has a pressure equalizing rod 6 having approximately the same diameter as the valve seat 7 so that the variable high gas pressure will not have too much effect on the low pressure provided and controlled by the pressure reducing valve. Chamber 8 into which the free end of rod 6 extends is connected by passageway 9 extending to the exterior of the housing A into the breathing bag which is the control chamber for the lung-controlled valve B. Passageway 9 could also lead to the surrounding open atmosphere. However, such construction would be disadvantageous because, if the rod seal 10 were not tight, life-sustaining gas would flow in small amounts to the atmosphere and be totally lost.

Pressure reducing actuating spring 11 forces pin 12 on piston C through the valve seat 7 and unseats valve head 5 so that the life-sustaining gas flows under low pressure into the pressure reducing chamber 13 and thus acts on accordion bellows 14. The pressure reducing valve head closes down on seat 7 as soon as a pressure equilibrium is formed between the spring 11 and the gas in chamber 13. The low pressure gas then flows through bore 15 into chamber 16 of the lung-controlled valve B. This valve B has a rocker plate 18 engaged with valve seat 17. As soon as rocker arm 19 connected to plate 18 is tilted by being engaged with the breathing bag or some flexible membrane, the rocker plate 18 lifts, on one side, from seat 17 so that the life-sustaining gas can flow into the breathing bag or into a membrane chamber from which it is inhaled by the user of the apparatus.

In addition to this lung-controlled metering feature, the rocker plate 18 and arm 19 are provided with a metering nozzle 20 and a passageway 21 so that a constant flow of life-sustaining gas can reach the breathing bag or membrane chamber.

Hollow socket 22 which contains the lung-controlled valve is threaded into housing A and forms both an abutment for the reducing spring 11 and a fastening means for the bellows 14.

Socket 22 also has a bore 23 so that the same pressure exists within a chamber defined by bellows 14 as in the breathing bag or surrounding atmosphere. Housing A has a collar portion for holding the cylindrical fitting 24 to which the breathing bag 25 is attached.

In the described invention, the lung-controlled valve B and pressure reducing valve C are axially aligned in housing A and socket 22 of the lung-controlled valve also functions as a part of the pressure reducing valve.

Having now described the means by which the objects of the invention are obtained, we claim:

1. A valve for connecting a compressed gas tank to a breathing apparatus comprising a valve housing, a pressure reducing valve in said housing, and a lung-controlled gas outlet valve in said housing axially aligned with said reducing valve, said outlet valve comprising a hollow socket threaded into said housing, a rocker plate valve head in said socket, first spring means bearing against said socket and said reducing valve for opening said reducing valve, and gas passageway means between said reducing valve and said outlet valve for the substantially axial flow of gas through said housing.

2. A valve as in claim 1, further comprising accordion bellows means joined to said socket for stabilizing said reducing valve.

3. A valve as in claim 2, further comprising a stabilizing bore through said socket from the interior of a chamber defined by said bellows to the exterior of said socket.

4. A valve as in claim 3, further comprising cap nut means on one end of said valve housing for connecting said housing to a gas tank, and collar means on said housing for joining said housing to a breathing bag.

5. A valve as in claim 3, further comprising a stabilizing rod joined to said reducing valve and having a diameter approximately the same as that of the valve seat for said reducing valve, a chamber in said housing into which the free end of said rod extends, and passageway means from said housing chamber to the exterior of said housing for giving said housing chamber the same pressure as that of the exterior of the housing.

References Cited

UNITED STATES PATENTS

| | | | |
|---|---|---|---|
| 1,710,815 | 4/1929 | Ebinger | 137—614.19 XR |
| 2,147,850 | 2/1939 | MacLean | 137—613 XR |
| 2,946,340 | 7/1960 | Hollman et al. | 137—594 XR |

WILLIAM F. O'DEA, Primary Examiner

RICHARD GERARD, Assistant Examiner

U.S. Cl. X.R.

137—505.18, 505.42, 614.21; 251—303